United States Patent [19]

Marmon

[11] 4,095,614
[45] Jun. 20, 1978

[54] LIQUID LEVEL CONTROL SYSTEM

[75] Inventor: Frank E. Marmon, Marietta, Ga.

[73] Assignee: The United States of America as represented by the Secretary of the Air Force, Washington, D.C.

[21] Appl. No.: 734,063

[22] Filed: Nov. 5, 1976

[51] Int. Cl.² .......................... F16k 31/34; F16k 31/02
[52] U.S. Cl. .................................. 137/414; 137/423; 251/26; 251/30; 251/46; 251/61.2
[58] Field of Search ............... 137/412, 413, 414, 415, 137/423, 389, 390; 251/30, 61.2, 26, 46

[56] References Cited

U.S. PATENT DOCUMENTS

| 2,683,580 | 7/1954 | Griswold | 137/414 X |
|---|---|---|---|
| 2,811,167 | 10/1957 | Bott | 137/414 |
| 2,811,168 | 10/1957 | Davies et al. | 137/414 |
| 2,871,873 | 2/1959 | McQueen | 137/413 |
| 2,888,030 | 5/1959 | McQueen | 137/413 |
| 3,237,639 | 3/1966 | Mosher | 137/412 |
| 3,693,649 | 9/1972 | Gordon et al. | 137/414 |

Primary Examiner—Martin P. Schwadron
Assistant Examiner—G. L. Walton
Attorney, Agent, or Firm—Joseph E. Rusz; Robert G. Hilton

[57] ABSTRACT

A system for controlling liquid flow from an inlet into a tank comprising a normally closed poppet valve controlled by dual pressure chambers each containing a diaphragm movable by the pressure of the liquid in the inlet to cause the valve to close. Pressure against the diaphragms is relieved by bleed passages extending from the chambers which are closed by dual solenoid operated closing mechanisms. Actuation of either one or both of the mechanisms can open the bleed passages.

7 Claims, 1 Drawing Figure

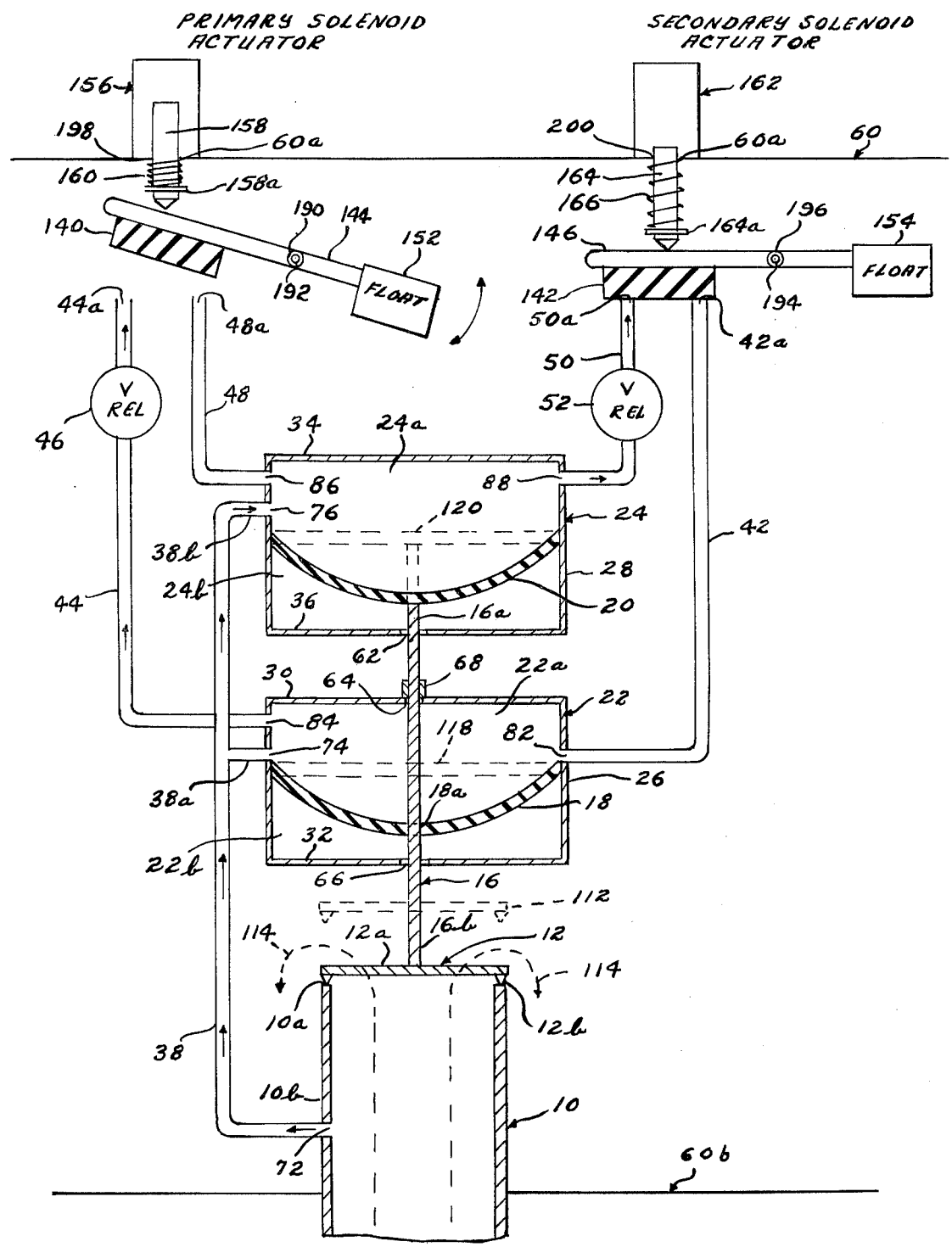

LIQUID LEVEL CONTROL SYSTEM

LICENSE

The invention described herein may be manufactured and used by or for the Government of the United States of America for governmental purposes without the payment of any royalties thereon or therefor.

BACKGROUND OF THE INVENTION

The invention relates to valves for controlling liquid flow, and is particularly adapted for use in fuel valves for aircraft. However, it is understood that the invention may have other applications.

Current military requirements necessitate cargo and other types of aircraft to have aerial refueling capability. Such capability requires that there be fuel level control valves on the aircraft which will open and allow fuel flow during an aerial refuel hookup. In addition, many new generation aircraft require that fuel be redistributed between tanks located in different parts of the aircraft during flight in order to maintain critical center of gravity control of the aircraft. This requires a dependable control valve which will allow fuel to flow from point to point as required.

In the past, valves used to perform these functions have been controlled by solenoids. Such valves are available in two different types: normally closed and normally open. A normally closed type valve requires that the solenoid be energized in order for the valve to open and fuel to flow, whereas a normally open type valve allows fuel to flow with the solenoid deenergized. Solenoid failure has been found to be a fundamental problem with both types of valves. In addition the valves require constant power while the solenoid is energized and if the amount of "solenoid on" time they are subject to is high, the life expectancy of the solenoid can be greatly reduced.

Accordingly, it is an object of the present invention to provide a valve system for the control of liquid flow, and especially for the control of fuel flow in an aircraft during refueling that is more reliable than previous systems.

It is another object of the present invention to provide a normally closed dual solenoid actuated valve system that can function upon the failure of one solenoid.

It is still another object of the present invention to provide a dual solenoid controlled liquid valve system in which each solenoid is used less often than solenoids in previous systems.

SUMMARY OF THE INVENTION

The present invention is directed to a control valve for regulating the flow of pressurized liquid into a tank, and in particular to a fail safe system for doing the same.

According to the invention, liquid flow into a tank is controlled by a system comprising a normally closed poppet valve positioned at an orifice of an inlet passageway to the tank. The valve includes a movable disk-shaped member adapted to cover the orifice and obstruct the passage of liquid into the tank. Movement of the disk-shaped member is controlled by the action of at least one pressure chamber positioned in confronting relationship to the disk-shaped member and having a flexible diaphragm of larger diameter than the disk-shaped member mounted therein. The diaphragm is positioned in the chamber so as to bulge outwardly when subjected to expansive forces of pressurized liquid introduced into the chamber by a pipe coupling liquid from the inlet passageway to the chamber. The diaphragm is linked to the disk-shaped member by a connecting rod which moves when the diaphragm bulges outwardly causing the disk-shaped member to move into sealing engagement against the orifice. The operation of the invention depends on the presence of pressurized liquid in the inlet passageway which is coupled to the pressure chamber and causes the diaphragm to move resulting in the disk-shaped member being moved to obstruct the inlet passageway.

The diaphragm causes the disk-shaped member to move because it is larger in diameter than the disk-shaped member and exerts a greater force on the disk-shaped member than the disk-shaped member exerts on the diaphragm under pressure of the liquid. The valve is opened to the passage of liquid by bleed passages extending from the pressure chamber that prevent the build-up of fluid pressure therein. With no fluid pressure to cause the diaphragm to move outwardly and consequently the disk-shaped member to move into sealing engagement with the orifice, the diaphragms retract to an undistorted position causing the disk-shaped member to move away from the orifice and allow fluid to pass into the tank. In addition, the force of the liquid pressure in the inlet passageway exerted on the disk-shaped member tends to move it away from the orifice allowing liquid to pass into the tank. The bleed passages are selectively opened and closed by a manually actuated solenoid closure mechanism.

Fail safe features are introduced into the valve system by an arrangement of primary and secondary pressure chambers having separate diaphragms and bleed passages, and primary and secondary solenoid closure mechanisms to control the bleed passages. When deenergized, the solenoid closure mechanisms operate to close the bleed passages and allow fluid pressure to build up in the chambers. Selective energization of either one or both the solenoid closure mechanisms will allow the bleed passages to be opened.

Additional features of the invention will become apparent to those skilled in the art on consideration of the following description, drawing, and claims.

BRIEF DESCRIPTION OF THE DRAWING

The accompanying FIGURE is a schematic view of a preferred embodiment of a level control system according to the present invention.

DETAILED DESCRIPTION

Referring to the drawing, a liquid inlet passageway 10, preferably of cylindrical cross section and terminating at an orifice 10a provides a means for pressurized liquid to flow into a reservoir or tank 60 having top and bottom walls 60a and 60b. In the preferred embodiment, it is contemplated that the pressurized fluid is liquid aircraft fuel and tank 60 is an aircraft fuel tank. A normally closed poppet or lift valve 12 comprising a disk 12a of substantially the same diameter as passageway 10 and having a flange 12b adapted to be firmly positoned against orifice 10a in sealing engagement therewith prevents liquid from flowing into tank 60.

Poppet 12 is movable between a closed positon where it covers orifice 10a to an open position (indicated at 112) where pressurized liquid passes through inlet passageway 10 into tank 60 (indicated by dotted lines 114). Movement of the poppet 12 is controlled by identical primary and secondary pressure chambers 22 and 24. The chambers are preferably cylindrical in shape having cylindrical side walls 26 and 28, respectively, and end walls 30, 32 and 34, 36, respectively, and are fixedly mounted by suitable means (not shown) such as braces within the tank 60. The chambers are axially aligned in tandem with respect to each other and in confronting relationship to the poppet 12. Chambers 22 and 24 are substantially identical in size and shape and have disposed within them flexible diaphragms 18 and 20, respectively, which divide the chambers into separate compartments (indicated at 22a, 22b, 24a and 24b). The diaphragms 18 and 20 are preferably made of flexible elastomeric material and are attached at their peripheries to the interior surfaces of cylindrical walls 24 and 26 of chambers 22 and 24 by suitable means (not shown) such as cement. The diaphragms 18 and 20 are connected to each other and to the disk 12a of poppet 12 by a linkage rod 16. Opposite ends 16a and 16b of rod 16 are attached, respectively, to opposing surfaces of diaphragm 20 and disk 12a at their centers by suitable means (not shown) such as cement. Rod 16 passes through a hole 18a in the center of diaphragm 18 and is fixedly attached to diaphragm 18 adjacent the hole also by suitable means (not shown) such as cement. Rod 16 passes through the bottom of secondary chamber 24 and the top and bottom of primary chamber 22 by means of apertures 62, 64 and 66, respectively, in the chamber end walls 36, 30 and 32. The apertures 62 and 66 may be considerably larger in diameter than the diameter of rod 16 to allow liquid in the tank 60 to enter compartments 22b and 24b so that the pressure of liquid in tank 60 exerted on the rod side of disk 12a may be countered by pressure exerted on the side of diaphragms 18 and 20 facing disk 12a. Aperture 64 is preferably fitted with a sleeve 68 of slightly larger diameter than rod 16 such that rod 16 is able to slide axially therethrough but which will nevertheless maintain the compartment 22a of chamber 22 substantially sealed from the exterior.

Compartments 22a and 24a of chambers 22 and 24 are made in fluid communication with inlet passageway 10 by a pipe 38 communicating with inlet passageway 10 through an aperture 72 in the cylindrical wall (indicated at 10b) of the inlet passageway 10. Pipe 38 has a branch 38a communicating with compartment 22a through an aperture 74 in the cylindrical wall 26 of chamber 22 and a branch 38b communicating with compartment 24a through an aperture 76 in the cylindrical wall 28 of chamber 24. Pipe 38 is fixedly connected to inlet passageway 10 and chambers 22 and 24 at apertures 72, 74 and 76 by suitable means (not shown) such as cement. With inlet passageway 10 in fluid communication with compartments 22a and 24a of chambers 22 and 24, compartments 22a and 24a will tend to fill with liquid until the pressure of liquid in the compartments is equal to the pressure of the liquid in the inlet passageway. The diaphragms 18 and 20 will bulge outwardly in an arcuate shape in response to the pressure of fluid in compartments 22a and 24a. Movement of the diaphragms 18 and 20 under the pressure of liquid in compartments 22a and 24a causes rod 16 to move axially towards poppet 12. Disk 12a is attached to the end 16b of rod 16 and also moves with rod 16. The chambers 22 and 24, rod 16 and disk 12a are axially aligned with inlet passageway 10 so that the aforesaid movement of rod 16 by diaphragms 18 and 20 will cause disk 12a to move into firm engagement with orifice 10a. With the disk and orifice so engaged, the inlet passageway 10 is closed to the passage of liquid.

The liquid in inlet passageway 10 exerts a force on disk 12a of poppet 12 equal to the fluid pressure times the surface area of the disk. The liquid in the compartments 22a and 24a of chambers 22 and 24 exerts a force on diaphragms 18 and 20, respectively, equal to the surface area of the diaphragms times the fluid pressure. Each diaphragm is made larger in diameter than disk 12a so that there is a greater force exerted on either diaphragm than on the disk 12a, so that when fluid pressure in the inlet and compartments is equalized, the diaphragms will overcome the force against the disk 12a and maintain it against orifice 10a.

Compartments 22a and 24a of pressure chambers 22 and 24 are provided with bleed passages to prevent the build-up of fluid pressure therein. Dual bleed passages are provided for each chamber as will be discussed in greater detail later. Turning to primary pressure chamber 22, bleed passage pipes 42 and 44 communicate with compartment 22a through apertures 82 and 84, respectively, in the cylindrical wall 26 of the chamber and vent into tank 60 through open ends 42a and 44a of pipes 42 and 44. Pipes 42 and 44 are fixedly connected to chamber 22 at apertures 82 and 84 by suitable means (not shown) such as cement. A standard safety or relief valve 46 of a type well known and commercially available is provided in pipe 44. Valve 46 operates such that it remains closed until the pressure of fluid in pipe 44 exceeds a predetermined amount. For purposes of the invention, the valve has been selected to open at a fluid pressure of 3.5 ± 0.5 psig.

Secondary pressure chamber 24 is provided with a similar bleed passage pipe arrangement having bleed passage pipes 48 and 50 communicating with compartment 24a through apertures 86 and 88 in the cylindrical wall 28 of the chamber and venting into tank 60 through open ends 48a and 50a of pipes 40 and 50. A safety or relief pressure valve 52, identical to valve 46, is provided in bleed passage pipe 50. According to the preferred embodiment of the invention, bleed passage pipes 42, 44, 48 and 50 are sized and arranged so that open ends 42a, 44a, 48a, and 50a lie in the same plane. In addition, the bleed pipes are arranged so that pipe 42 from chamber 22 and pipe 50 from chamber 24 are grouped together and that pipe 44 from chamber 22 and pipe 48 from chamber 24 are grouped together.

A closing lid 140, preferably made of elastomeric material and located adjacent the open ends 44a and 48a of pipes 44 and 48 is provided to prevent fluid from exiting from compartments 22a and 24a through pipes 44 and 48. The lid 140 is fixedly mounted by suitable means (not shown) such as cement to one end of a pivot arm 144. The pivot arm 144 has an aperture 190 therein through which the arm is rotatably mounted to a pin 192. The pin 192 is secured to the tank by suitable fastener means (not shown). A liquid level float 152 is fixedly attached to the end of pivot arm 144 opposite lid 140. The weight of float 152 is designed to be greater than lid 140 so that the lid will be raised as shown in the drawing when no external forces operate on arm 144. The level of liquid in tank 60 will cause float 152 to raise and lid 140 to lower until it rests atop the open ends 44a and 48a of pipes 44 and 48, thereby substantially closing the pipes to the passage of liquid. It is noted that means other than float 152 may be used for moving lid 140, for example, such as an electrical liquid level sensing device located in the tank 60 with a means to allow lid 140 to be moved in response to its indications.

A second closing lid 142, also preferably made of elastomeric material is located adjacent the open ends 42a and 50a of pipes 42 and 50 in order to selectively prevent flow from exiting from compartments 22a and 24a through pipes 42 and 50. The mounting and operation of closing lid 142 is the same as that of closing lid 140 and need not be described except to note that the lid 142 is attached to one end of a pivot arm 146, which is rotatably mounted on a pin 194 (secured to tank 60) through an aperture 196 in the arm. A liquid level float 154 is attached to the other end of arm 146 and operates in the same manner as float 152 to close pipes 42 and 50 to the passage of liquid when raised by the level of liquid in tank 60. Arms 144 and 146 in the preferred embodiment are located in the same plane and are intended to operate in unison in response to liquid in the tank.

A manual controlled primary solenoid actuator 156 preferably mounted by suitable means (not shown) outside tank 60 has an actuating arm 158 extending in the tank to engage arm 144 in such a way that when extended, it causes lid 140 to close pipes 44 and 48 irrespective of liquid level in the tank. When retracted, the actuator 156 has no effect on the operation of arm 144 and it operates as described above. Primary solenoid actuator 156 can be any suitable commerically available solenoid and as such it will not be described in detail. It is noted however, that the actuating arm 158 extends through an aperture 198 in the wall 60a of tank 60. The arm has a flange 158a adapted to engage one end of a coaxially mounted spring 160. The other end of the spring engages the interior wall 60a of tank 60. The spring 160 acts to maintain the arm 158 extended when the solenoid is not energized. In order for the lid 140 to be raised, the actuator 156 must be energized and the liquid level in the tank must be sufficiently low that it does not affect float 152. If either the liquid level in the tank is too high or the actuator 156 is deenergized, the lid 140 will close bleed passage pipes 44 and 48.

A secondary manual controlled solenoid actuator 162 preferably identical to primary solenoid actuating means 156, is also mounted outside tank 60 and has an actuating arm 164 extending in the tank through an aperture 200 in the wall 60a of tank 60. The arm 164 has a flange 164a for retaining a spring 166 in like manner to the spring 160 of actuator 158.

In operation, poppet 12 is closed when both actuators 156 and 162 are deenergized. This in turn causes both closing lids 140 and 142 to close the ends 44a, 48a, 42a and 50a of bleed passage pipes 44, 48, 42 and 50 to the flow of liquid from compartments 22a and 24a of pressure chambers 22 and 24. This causes the liquid in compartments 22a and 24a to build in pressure until it equals the liquid pressure in the inlet passageway 10, which in turn causes diaphragms 18 and 20 to move toward poppet 12, resulting in rod 16 causing disk 12a to move into engagement with orifice 10a, thereby closing the inlet passageway 10.

If the liquid level in the tank is sufficiently high, floats 152 and 154 will also close the pipes 44, 48, 42 and 50 to fluid flow regardless of whether the actuators 156 and 162 are activated or deactivated. If the liquid level is sufficiently low so that floats 152 and 154 are not affected thereby, liquid may be caused to flow into the tank by energizing either or both the actuators 156 and 162. This allows either or both lids 140 and 142 to raise and liquid to exhaust through bleed passage pipes 44, 48, 42 and 50 into the tank 60. This sufficiently relieves the pressure acting in compartments 22a and 24a normally against diaphragms 18 and 20 allowing them to retract to an undistorted position as shown in dotted lines 118 and 120, respectively, resulting in disk 12a moving out of engagement with orifice 10a as shown in dotted lines 112.

In operation, only one solenoid actuator is used to allow liquid to enter tank 60. The other solenoid actuator is available as a backup if the one solenoid actuator should fail. Preferably, the solenoid actuators are alternately used to prolong their life. The safety or relief valves 46 and 52 (preferably operable at 3.5 ± 0.5 psig) are used to check the operation of the system. The check is accomplished as follows: energize primary solenoid actuator 156 with secondary solenoid actuator 162 deenergized. Gradually increase the liquid pressure in inlet passageway 10 to slightly less than 3.0 psig and verify that the valve remains closed by noting whether no liquid flows through poppet 12. Increase the pressure above 4.0 L psig and note whether liquid does flow through the poppet 12. This verifies that the primary solenoid actuator 156, valve 46, and primary pressure chamber 22 are operative. Energize the secondary solenoid actuator 162 and repeat the above to check the operation of the secondary system. Correct operation of the floats 152 and 154 can be verified by separately energizing each solenoid and raising the liquid level in tank 60 until the float is raised and the flow is stopped.

Having described the preferred embodiment of my invention, it should be understood that various modifications obvious to those skilled in the art are contemplated and may be used without departing from the spirit and scope of this invention. For example, it is contemplated that movable pistons may be substituted for the diaphragms 18 and 20 in primary and secondary pressure chambers 22 and 24.

I claim:

1. A liquid level control valve for a tank comprising:
a liquid inlet to said tank;
a poppet associated with said inlet;
said poppet having a first position which completely covers said liquid inlet so that no liquid may exit and a second position which does not prevent liquid from exiting said inlet;
two diaphragm chambers fixedly mounted in said tank;
two diaphragms, one of which is mounted in each diaphragm chamber, each diaphragm having a working surface area greater than the cross section of the exit of said liquid inlet;
means connecting each diaphragm to the poppet so that during expansion of liquid in either diaphragm chamber the poppet moves to its said first position, and during exhaust of liquid from the diaphragm chamber the poppet moves to said second position;
a chamber pressurization passage connecting the liquid inlet and the expansion chamber of one diaphragm chamber;
a second pressurization passage connecting the liquid inlet and the expansion chamber of the other diaphragm chamber;
two bleed passages extending from the expansion chamber of one diaphragm chamber;
two additional bleed passages extending from the expansion chamber of the second diaphragm chamber;

a relief valve located in one of the bleed passages from one diaphragm chamber;

a second relief valve located in one of the bleed passages from the second diaphragm chamber;

a first lid mounted in said tank having a first position which covers the exits of the bleed passage without the relief valve from the second diaphragm chamber and the bleed passage from the first diaphargm chamber containing the relief valve, and a second position which does not cover either exit;

a second lid mounted in said tank having a first position which covers the exits of the bleed passage without the relief valve from the first diaphragm chamber and the bleed passage from the second diaphragm chamber containing the relief valve, and a second position which does not cover either exit;

means for causing said first lid to assume said first position in response to the level of liquid in said tank being above a first predetermined level;

means for causing said second lid to assume said first position in response to the level of liquid in said tank being above a second predetermined level;

first actuating means for causing said first lid to assume said first position when said first actuating means is deenergized and to assume said second position when the level of liquid in the tank is not above said first predetermined level and said first actuating means is energized; and second actuating means for causing said second lid to assume said first position when said second actuating means is deenergized and to assume said second position when the level of liquid in the tank is not above said second predetermined level and said second actuating means is energized.

2. A liquid level control valve is defined in claim 1, wherein said lids are made of elastomeric material.

3. A liquid level control valve as defined in claim 1, wherein said first and second actuating means are solenoids.

4. A liquid level control valve as defined in claim 1, wherein both means for causing the lids to assume their first position are floats.

5. A liquid level control valve as defined in claim 1, wherein the first and second predetermined levels are equal.

6. Apparatus as defined in claim 1, wherein each of the first and fourth pressure bleed passages contains a pressure relief valve which operates at a pressure below the nominal pressure of the inlet fluid.

7. Apparatus for controlling inlet flow and liquid level within a tank, comprising:

an inlet for pressurized liquid;

a valve member for opening and closing the inlet;

two separate cavities forming first and second pressurization chambers;

a means responsive to fluid pressure in each of the two pressurization chambers for closing said valve;

a conduit connecting the pressurized liquid at the inlet to each of the two pressurization chambers;

a first and second pressure bleed passage communicating with the first pressurization chamber, either being capable of bleeding fluid pressure from said first chamber;

a third and fourth pressure bleed passage communicating with the second pressurization chamber, either being capable of bleeding fluid pressure from said second chamber;

a first closure means for sealing said first and third pressure bleed passages;

a second closure means for sealing said second and fourth pressure bleed passages;

a first and second liquid level responsive means for actuating said first and second closure means, respectively;

a first and second solenoid means for actuating said first and second closure means, respectively, configured such that when said first solenoid means is deenergized said first closure means seals the first and third bleed passages irrespective of the state of said first liquid level responsive means, and when said second solenoid means is deenergized said second closure means seals the second and fourth bleed passages irrespective of the state of said second liquid level responsive means, while energizing either solenoid inhibits that solenoid's effect on its respective closure means.

* * * * *